Figure 1:
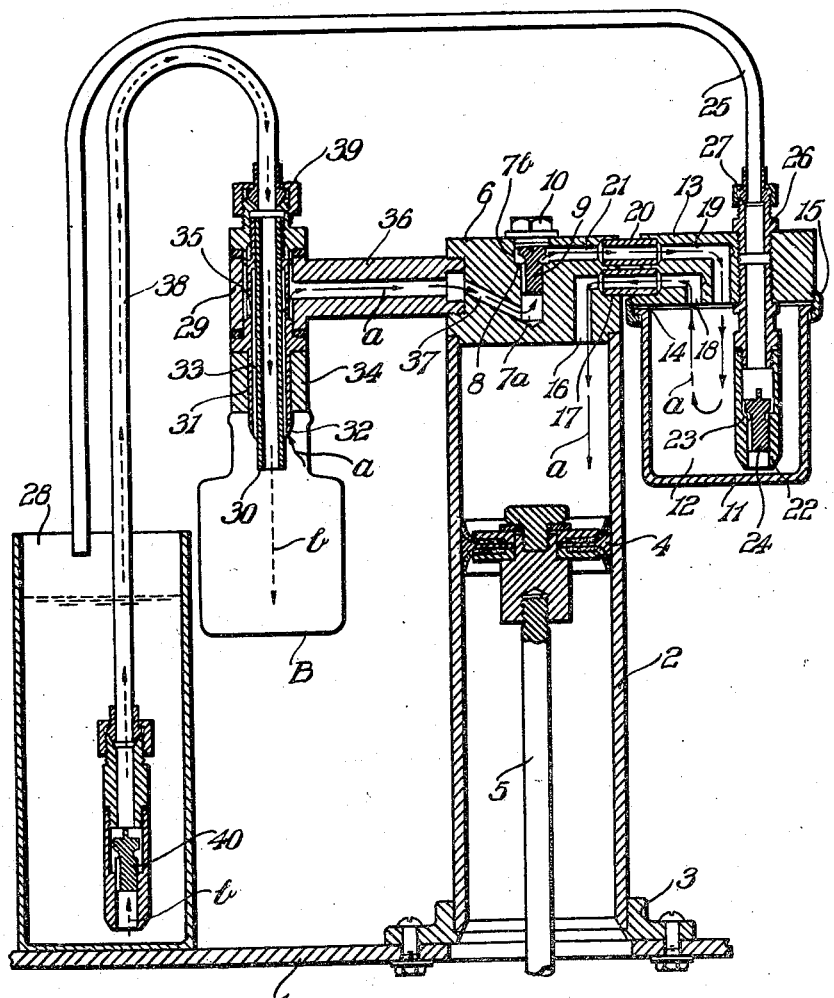

Oct. 21, 1952             A. H. PRICE          2,614,742
APPARATUS FOR CHARGING CONTAINERS WITH
MEASURED QUANTITIES OF LIQUID

Filed Jan. 30, 1948                                  6 Sheets-Sheet 1

INVENTOR.
Arthur Herbert Price
BY
Barr, Borden & Fox
ATTORNEY

Oct. 21, 1952 — A. H. PRICE — 2,614,742
APPARATUS FOR CHARGING CONTAINERS WITH
MEASURED QUANTITIES OF LIQUID

Filed Jan. 30, 1948 — 6 Sheets-Sheet 4

INVENTOR.
Arthur Herbert Price,
BY Barr, Borden & Fox
ATTORNEY

Oct. 21, 1952

A. H. PRICE 2,614,742

APPARATUS FOR CHARGING CONTAINERS WITH
MEASURED QUANTITIES OF LIQUID

Filed Jan. 30, 1948

6 Sheets-Sheet 5

INVENTOR.
Arthur Herbert Price,
BY Barr, Borden & Fox
ATTORNEY

Patented Oct. 21, 1952

2,614,742

UNITED STATES PATENT OFFICE 2,614,742

APPARATUS FOR CHARGING CONTAINERS WITH MEASURED QUANTITIES OF LIQUID

Arthur Herbert Price, London, England, assignor, by mesne assignments, to Gaskell & Chambers Limited, Birmingham, England, a corporation of Great Britain Application January 30, 1948, Serial No. 5,233
In Great Britain August 16, 1946

Section 1, Public Law 690, August 8, 1946
Patent expires August 16, 1966

13 Claims. (Cl. 226—113)

This invention relates to apparatus for dispensing measured quantities of liquid and has for its main object to provide an improved construction of apparatus for charging bottles or other receptacles from a bulk supply with any predetermined quantity of liquid.

It is also an object of the invention to provide an improved liquid dispensing apparatus which is easy to construct and assembly, can be readily dismantled for cleaning, and which avoids contamination of the liquid by contact with the working parts of the apparatus.

According to the invention the improved apparatus for dispensing measured quantities of liquid comprises a piston arranged to reciprocate within a cylinder in communication with a chamber having inlet and outlet conduits provided with non-return valves, said inlet conduit and a conduit leading from a liquid supply being connected to a sealing member adapted to communicate with and to close the mouth of a receptacle when applied thereto whereby movement of the piston in the cylinder in one direction expels air from the cylinder through the chamber and its outlet and in the other direction withdraws air from the receptacle and so draws into the receptacle a quantity of liquid determined by the stroke of the piston.

Preferably, the inlet and outlet conduits to the chamber are so arranged that in the event of over-filling of the receptacle, which may occur when the apparatus is being primed or adjusted, the surplus liquid which is drawn into the chamber cannot pass into the cylinder but is expelled from the chamber upon the succeeding pressure stroke of the piston.

According to another form of the invention the improved apparatus comprises a piston mounted for reciprocation within a cylinder in communication with a chamber having inlet and outlet conduits connected respectively to a liquid supply and to a point of discharge beneath which the receptacle is placed, non-return valves in said conduits operable in such manner that movement of the piston within the cylinder in one direction draws liquid from the supply into the chamber and on the return stroke effects discharge of the liquid from said chamber into the receptacle, and valve means associated with the cylinder and controlling the exhaustion of air from the chamber to prevent accumulation of liquid therein.

In both forms of the invention the piston may be manually or power operated and means may be provided for varying the effective stroke of the piston in order to modify or regulate the amount of liquid dispensed at each operation thereof.

Figure 2:
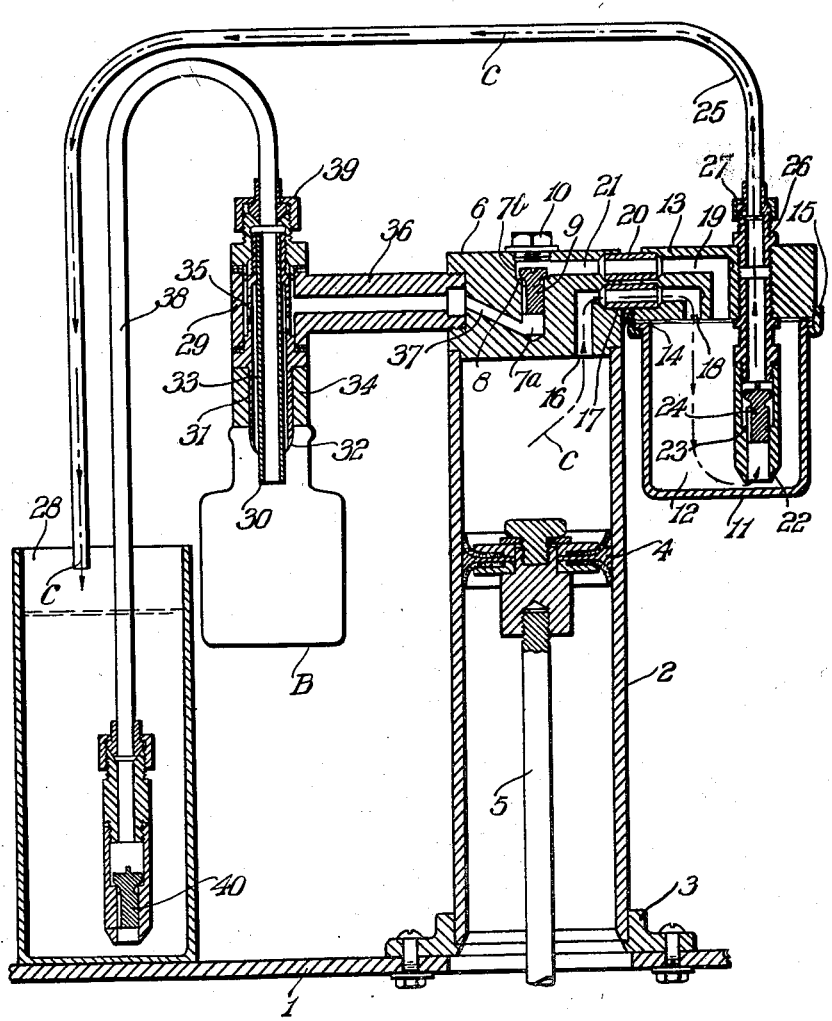
Figure 3:
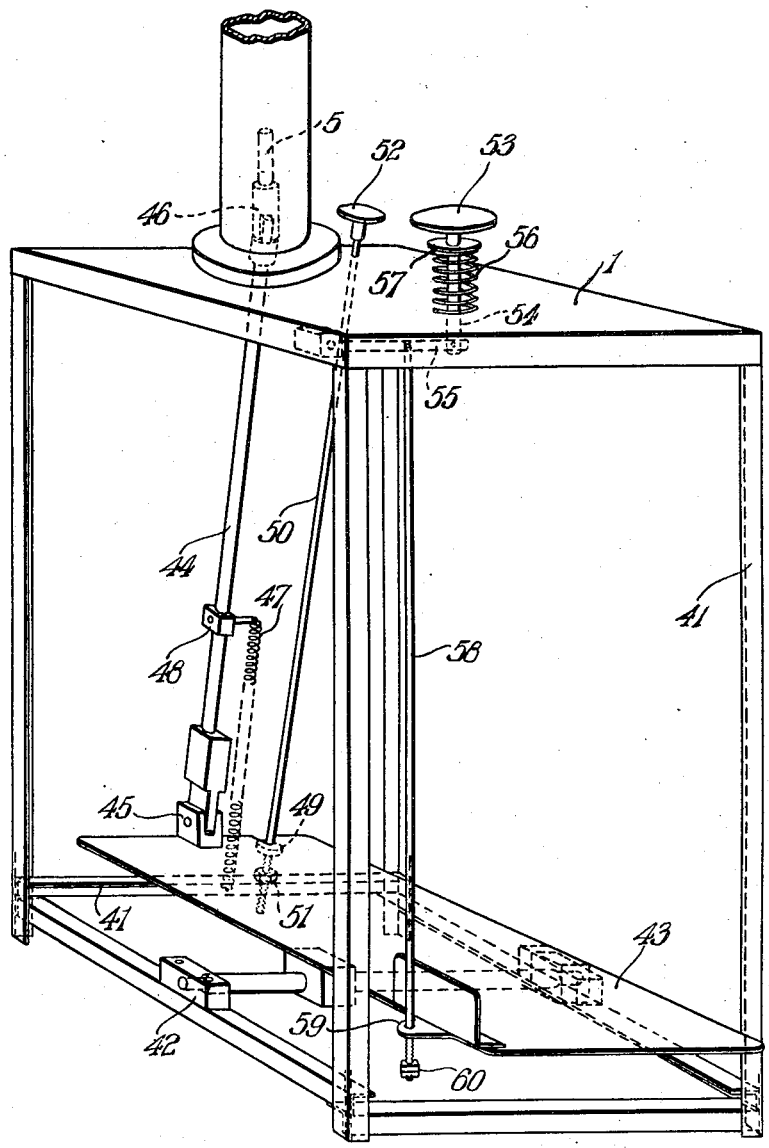
Figure 4:
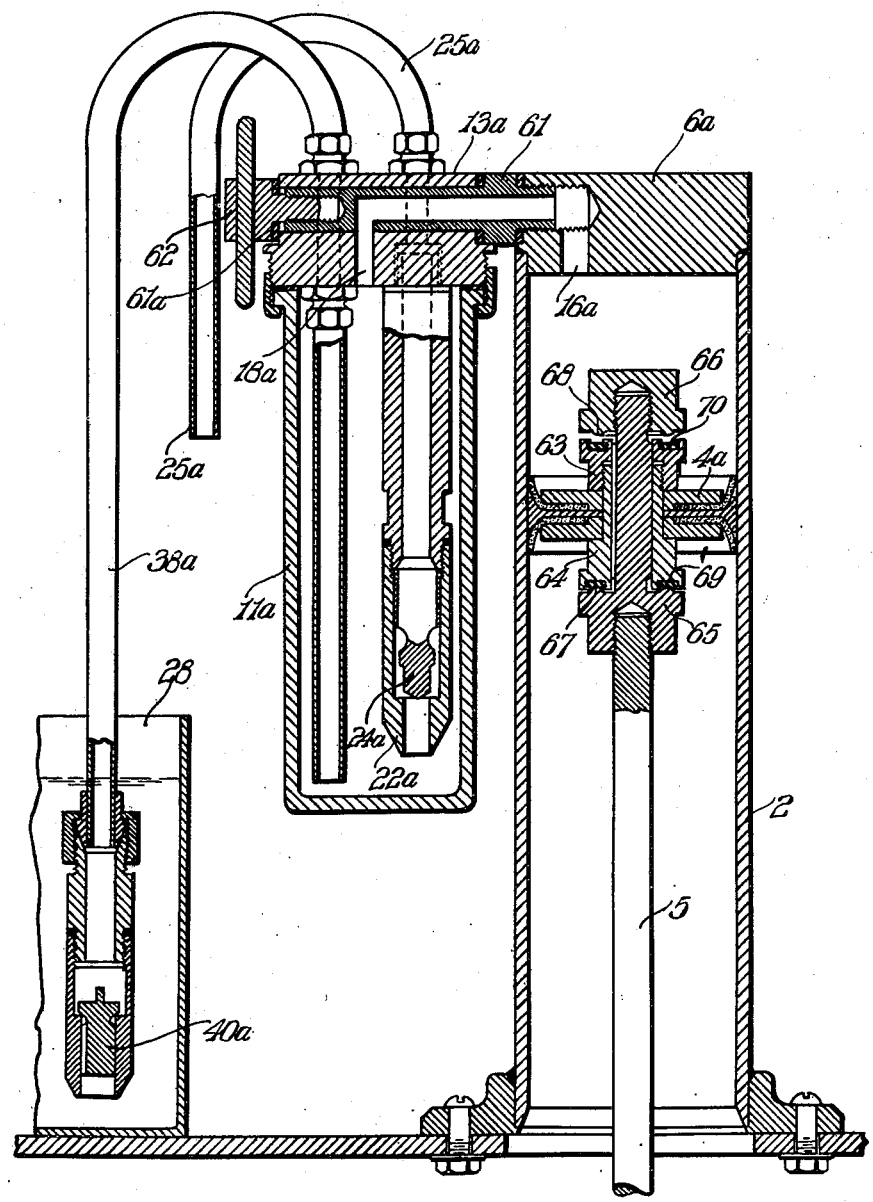

Reference will now be made to the accompanying drawings which illustrate several embodiments of the invention and wherein:

Fig. 1 is a sectional elevation of the dispensing portion of one form of the apparatus and with the piston on the suction stroke, Fig. 2 is a view similar to Fig. 1 but with the piston on the pressure stroke, Fig. 3 is a perspective view of a supporting structure for the apparatus shown in Figs. 1 and 2 and showing treadle mechanism for operating the piston, Fig. 4 is a sectional elevation of another form of the invention and embodying means for balancing pressures upon either side of the piston when said piston reverses its direction of movement.

Figure 5:
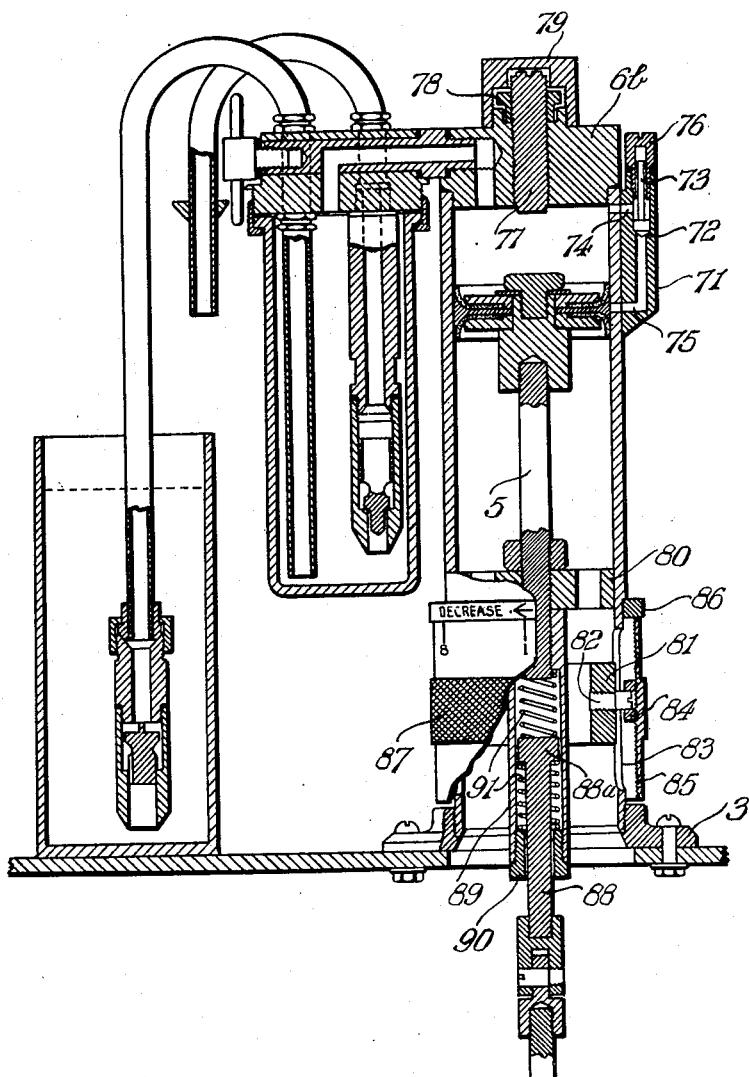
Figure 6:
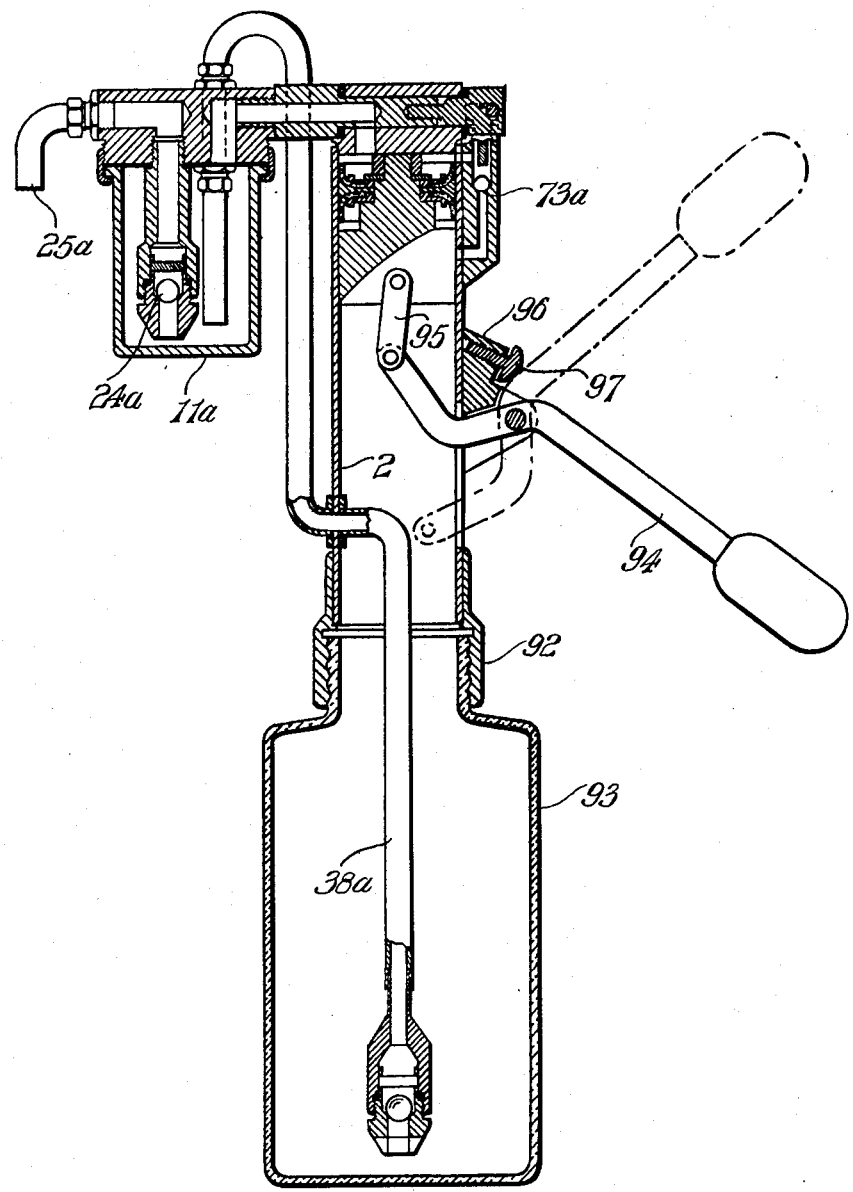

Fig. 5 is a sectional elevation of a further modification wherein positive stop means are provided for determining the stroke of the piston and Fig. 6 is a sectional elevation of a hand operated form of the invention particularly adapted for mounting upon a jar or container from which liquid is to be dispensed.

Referring first to Figs. 1 and 2, there is shown a base plate 1 providing a supporting surface for the several components of the dispensing apparatus, a cylinder 2 open at its lower end being supported in vertical position upon said plate by means of a foot plate 3 and a piston 4 movable in said cylinder being carried on the upper end of a piston rod 5 which extends downwardly through an aperture in the base plate for connection to piston actuating mechanisms hereinafter described. The upper end of the cylinder is closed by a head 6 which is press fit therein or otherwise secured to provide a fluid-tight joint, the said head being counterbored at its centre in such manner as to provide an inner bore portion 7a and an outer bore portion 7b of larger diameter than the bore 7a. The two bore portions define between them a seating 8 for a poppet type valve 9, hereafter termed the vacuum valve, the upper end of bore 7b being closed by a screwed plug 10. In place of the poppet valve 9, a ball or other type valve may be employed.

The apparatus also comprises a subsidiary container 11 defining the suction and pressure chamber 12, said container being closed at its upper end by a head 13. In the form shown, the head is clamped upon a flanged portion of the container and with the interposition of a sealing gasket 14 by a screwed ring 15 but any equivalent means may be employed for effecting a fluid tight closure. A passage 16 extending through the cylinder head 6 is connected by a detachable union 17 to a similar passage 18 formed in the container head 13 so that the upper end of the cylinder 2 and the chamber 12 are in permanent communication. A further passage 19 in the container head 13 is connected by a detachable union 20 to another passage 21 in the cylinder head 6 leading to the bore 7b at a point above the vacuum valve 9. An outlet from the chamber 12 is provided by a tubular fitting 22 supported in the head 13, said fitting being formed with a seating 23 for a second poppet valve 24, hereafter termed the outlet valve. Preferably, the fitting 22 is formed in two parts as shown to facilitate dismantling and cleaning. An outlet pipe 25 is placed in communication with the fitting 22 by means of a screwed sleeve 26 mounted in the outer side of the head 13 and a union 27, said pipe extending into the top of a container 28 from which liquid is to be dispensed.

The apparatus shown is particularly adapted for filling or charging bottles and for this purpose there is included a filler head 29 comprising an inner tube 30 and an outer sleeve 31 which embraces the tube 30 at its upper end to support it but is spaced from said tube over the major portion of its length. The lower end of the sleeve may be inturned to grip the tube but in this case is slotted as shown at 32 so that when the mouth of a bottle B is placed over the lower end of the filler head its interior will be in communication with the annular space 33 between tube 30 and sleeve 31. A rubber cushion 34 placed around the lower portion of the sleeve 31 serves to close the mouth of a bottle when placed in the filling position. The sleeve 31 is apertured as shown at 35 and clamped upon the upper portion of said sleeve is a tubular T-piece 36 which is detachably connected to the cylinder head 6 in such position as to communicate with a passage 37 therein leading to the underside of the vacuum valve. An inlet pipe 38 is connected to the upper end of the filler head by a union 39, said pipe leading into the liquid supply container 28 and being provided at its lower end with an inlet valve 40 of similar construction to the outlet valve.

The apparatus described operates in the following manner. Upon a downward or suction stroke of the piston with a bottle B positioned on the filler head as shown, air will be drawn into the cylinder from chamber 12, thus holding outlet valve 24 closed and opening vacuum valve 9, and air will thus be exhausted from the bottle as indicated by the arrows a, see Fig. 1. The reduced pressure in the bottle will cause inlet valve 40 to open and liquid will flow from container 28 through pipe 38 and tube 30 into the bottle in a quantity depending upon the stroke or volumetraic displacement of the piston and as indicated by arrows b.

Upon the return or pressure stroke of the piston, see Fig. 2, the inlet and vacuum valves close and the air expelled from the cylinder into chamber 12 lifts or opens outlet valve 24 and escapes through pipe 25 as indicated by arrows c.

If, when priming the system or when adjusting the stroke of the piston to modify the quantity of liquid delivered, the bottle is over-filled the surplus liquid will be drawn into and will collect in the bottom of the container 11 from which point it cannot be sucked into the cylinder but will be expelled through the outlet device 22 upon the next pressure stroke of the piston.

As a further safeguard against entry of fluid into the cylinder, the subsidiary container 11 should have a capacity exceeding the maximum volumetric displacement of the piston. Thus should an operator actuate the piston two or more times without removing the filled bottle, the excess or surplus liquid drawn into the container 11 at each suction stroke of the piston will not reach the lower end of passage 18 in the container head, and as each quantity of liquid drawn into container 11 is expelled on the succeeding pressure stroke no accumulation of liquid occurs in said container and a level high enough to enable the liquid to flow over into the cylinder is never reached.

Fig. 3 shows a supporting structure for the apparatus above described. It will be seen that the base plate 1 is supported at table top height by a framework 41, constructed of angle iron or other suitable material, said framework providing at its lower end a pivotal support 42 for a treadle plate 43 used for actuating the piston 4. A connecting rod 44 is attached to the rear end of the treadle plate by a hinged joint 45 and to the lower end of the piston rod 5 by a pivotal or universal joint 46, a tension spring 47 extending between an adjustable collar 48 on the connecting rod and a fixed point on the frame 41 serving to urge the rear end of the treadle plate in a downward direction. Said downward movement of the treadle plate is limited by engagement with a stop 49 fast on a rod 50 which has screw threaded engagement with a nut 51 fixed to the frame 41 and is provided at its upper end with a finger knob 52 so that it may be rotated to adjust the position of the stop.

During filling, the bottle is supported in sealing relation with the filler head by a platform 53 carried by a stem 54 attached to a lever arm 55 pivotally mounted on the frame, a spring 56 being interposed between the base plate 1 and a collar 57 on stem 54 to urge the platform to the operative position. A rod 58 attached to the lever arm extends downwardly through a lug 59 on the treadle plate and carries an adjustable stop 60 on its lower end for engagement by said lug.

It will be seen that with the arrangement described the suction stroke of the piston is effected by the tension spring 47 and the pressure stroke by the downward pressure of the operator's foot upon the forward end of the treadle plate. As the treadle plate approaches the limit of the pressure stroke the lug 59 engages stop 60 and, through rod 58 and lever arm 55, depresses the platform 53 to permit the filled bottle to be removed and an empty bottle to be substituted.

The pressure stroke may be limited by any suitable stop means embodied in the piston and cylinder or in the treadle mechanism.

Fig. 4 illustrates another form of the invention which operates on a slightly different principle. A vertically disposed cylinder 2 closed at its upper end by a head 6a and a subsidiary container 11a closed by a head 13a are provided as before, a passage 16a in the cylinder head being connected to a passage 18a in the container head to provide a permanent communication between the upper end of the cylinder and the subsidiary container. The connection between the two passages is preferably provided by a tubular plug 61 having a close fit within a transverse bore in the container head 13a, one end of the plug having screw-threaded connection with the cylinder head and the other end being threaded to receive a headed bolt 62 provided with a tommy bar or equivalent turning means and cooperating with a flange 61a on the plug to seal the ends of the said transverse bore.

An inlet pipe 38a leading from the liquid supply container 28 and fitted with a non-return inlet valve 40a extends through the head 13a and into container 11a, whilst an outlet from the container is provided by a tubular fitting 22a embodying a non-return outlet valve 24a and an external outlet pipe 25a, any known form of gland being used for sealing the apertures in the container head through which the inlet and outlet connections extend.

The piston 4a is actuated by any suitable means, as for example the treadle mechanism shown in Fig. 3, and it will be seen that upon a downward or suction stroke of the piston, outlet valve 24a is held closed and inlet valve 40a opens permitting liquid to be drawn from container 28 into subsidiary container 11a in a quantity depending upon the stroke or volumetric displacement of the piston, whilst the upward or pressure stroke of the piston closes the inlet valve and opens the outlet valve whereby the liquid in container 11a is forced out into a cup or other receptacle placed beneath the discharge end of the outlet pipe 25a.

In pumping apparatus operated by a reciprocating pump there is in certain instances a continued flow of liquid along the inlet connections for a short period after cessation of the suction stroke of the pump piston, due to the residual vacuum in the pump cylinder and the acquired momentum of the inflowing column of liquid, and if such a flow was permitted in the apparatus above described there would be a possibility of the subsidiary chamber becoming fully charged with liquid and overflow into the pump cylinder. Accordingly, a feature of the present invention resides in the provision of means for avoiding this defect and one form thereof is shown in Fig. 4. The valve means illustrated operates to equalize pressures at opposite sides of the piston temporarily each time the piston reverses its direction of movement, and for this purpose the piston 4a is clamped upon a two-part tubular piston head 63 mounted upon a fluted spindle 64 attached to the connecting rod 5, the said spindle being formed at one end with a flange 65 and threaded at the other end to receive a nut 66 which limit movement of the piston head relative to the spindle. The inner faces of flange 65 and nut 66 are each formed with an annular rib or valve facing 67, 68 respectively which cooperate with resilient valve seatings 69, 70 recessed into the ends of the piston head. Thus when the piston is on a pressure stroke as shown, valve facing 67 engages seating 69 to close the passage formed by the flutings on the spindle but when at the top of the stroke the piston head 63 reverses its direction of movement the piston 4a remains stationary until valve facing 68 engages seating 70, and during the interval between disengagement of valve elements 67, 69 and engagement of valve elements 68, 70 communication is established between opposite sides of the piston. This temporary connection of the cylinder space to atmosphere eliminates any residual pressure in the cylinder and so prevents dripping at the outlet. Similarly, at the end of a suction stroke of the piston, the positions of the valve elements are again reversed and an intake of air to replace any residual vacuum in the cylinder is permitted thereby providing a full quota of air in the cylinder for the next pressure stroke of the piston and ensuring that the whole contents of the subsidiary chamber are ejected upon said stroke. In this manner contamination of the liquid by contact with the piston and cylinder mechanism is effectively prevented and accurate dispensing of predetermined quantities of liquid assured.

Fig. 5 illustrates a modification of the apparatus shown in Fig. 4 which embodies alternative valve means for controlling exhaustion of air from the cylinder and subsidiary container. As shown, a housing 71 having a bore defining a seating 72 for a valve 73 is mounted at the side of the upper end of the cylinder 2, the upper and lower ends of the said bore having connection with the cylinder space by lateral ports 74, 75 respectively. The housing 71 is closed at its upper end by a detachable cap 76 which is recessed to accommodate and guide the stem of the valve 73.

The control valve operates in the following manner:

During the initial portion of a downward stroke of the piston no exhaustion of air from the subsidiary chamber occurs as a depression above the piston will lift the valve 73 off its seating and so equalize pressures above and below the piston. When, however, the piston has covered the lower port 75 such balancing of the pressures is no longer possible and the remainder of the suction stroke will be effective to draw liquid into the subsidiary chamber in the usual manner. On the reverse or pressure stroke, the piston is operative throughout its whole movement as even after the piston has moved above the port 75 the pressure above the piston will hold valve 73 firmly upon its seating. Thus a greater quantity of air is displaced from the cylinder on the pressure stroke than is drawn into the cylinder on the suction stroke and in this way complete expulsion of the liquid in the subsidiary container is ensured in each cycle of operations.

Fig. 5 also shows alternative means for determining the stroke of the piston, said means in this case comprising stops adapted to be engaged by the piston and adjustably mounted in order that the quantity of liquid dispensed at each operation may be regulated. The upper limit of piston travel is determined by a plug 77 mounted in the cylinder head 6b and having a screw threaded connection therewith for adjustment purposes, the lower end of the plug projecting into the cylinder for engagement by the piston and the upper end of the plug receiving a locknut 78 and being enclosed by a detachable cover 79. The downward travel of the piston is limited by the engagement of a perforated disc 80 fast on the piston rod 5 with a stop ring 81 mounted within the lower portion of the cylinder. To provide adjustment of the stop ring it is apertured to receive a grub screw 82, which extends radially through a vertical slot 83 in the cylinder wall, the head of the screw engaging in a hole formed in a ring 84 encircling the cylinder. The outer face of ring 84 is threaded to engage an internally threaded outer sleeve 85, the latter being located between the footplate 3 and an upper abutment ring 86 fast on the cylinder and being preferably knurled as at 87 to facilitate manual rotation. Thus it will be seen that rotation of the sleeve 85 raises or lowers the stop ring 81 and co-operating markings may be provided on the said sleeve and on the abutment ring 86 to indicate the set position of the stop ring.

Where the stroke of the piston is limited by stops as above described it is preferred to provide a resilient connection between the piston and the treadle or other piston actuating mechanism. In the arrangement shown in Fig. 5 the pivotal connection on the upper end of the connecting rod is attached to an intermediate rod 88 which extends into a tubular casing 89, said casing being secured at its upper end to the piston rod 5 and being provided with a closure plug 90 at its lower end. A pair of compression springs 91 interposed between the ends of the casing 89 and a head 88a on the intermediate rod normally prevent relative movement of said casing and intermediate rod but any movement of the piston actuating mechanism after the piston has been arrested merely displaces the intermediate rod within the tubular casing against one or other of the centering springs 91.

Fig. 6 illustrates a further modification of the arrangement shown in Fig. 4 wherein the dispensing apparatus is mounted upon a jar or other container and is adapted to dispense liquid from said container. For this purpose the lower end of the cylinder 2 is secured to an adaptor 92 threaded internally so that it may be mounted upon the mouth of the jar 93 in place of the usual screw cap, the inlet pipe 38b to the subsidiary container being cranked so as to pass through the wall of the cylinder 2 and to extend into the jar and being provided with a non-return inlet valve at its lower end. The piston is adapted to be actuated by a hand lever 94 connected thereto by a link 95, the lever being pivoted on a bracket 96 on the side of the cylinder and the bracket embodying an adjustable stop 97 which by engagement with the lever 94 determines the limit of the downward stroke of the piston.

The apparatus above described operates in a manner similar to those shown in Figs. 4 and 5, liquid being drawn into the subsidiary container 11a from the jar 93 on the suction stroke of the piston and being ejected past the outlet valve 24a to the outlet or discharge pipe 25a on the pressure stroke of the piston. The degree of exhaustion produced on each suction stroke may be controlled by a balancing valve in a manner similar to that described with reference to Fig. 5, but shown in this case with a ball valve 73a, but it will be understood that the form of balancing valve shown in Fig. 4 may be employed if desired.

It will be seen that the liquid dispensed by the apparatus according to the invention does not come into contact with the piston or cylinder and the apparatus is thus particularly suitable for dispensing liquids such as milk, for example, where freedom from contamination is essential. The number of parts requiring cleaning is small and such parts are arranged so as to be readily dismountable for inspection and cleaning. The apparatus may also be cleansed by operating whilst connected to a supply of any suitable cleansing liquid.

Having now particularly described and ascertained the nature of my said invention, and in what manner the same is to be performed, I declare that what I claim is:

1. Apparatus for dispensing measured quantities of liquid comprising a cylinder, a piston slidable in and forming with the cylinder a pulsating pump of predetermined maximum effective piston displacement, a chamber, a continuously open passage between the pump and the chamber, said chamber having a predeterminedly larger volumetric capacity to the level of said passage than the maximum effective displacement of said piston, an inlet conduit communicating with said chamber, a non-return valve in the inlet conduit opening under suction in the chamber and closing under pressure in the chamber, an outlet conduit communicating with the chamber at a lower level than said passage, a non-return valve in the outlet conduit opening under pressure in the chamber and closing under suction in the chamber, whereby the pump on the suction stroke draws a given volume of fluid through the inlet conduit into said chamber, and supplemental valve means associated with the pump whereby on the pressure stroke thereof a volume of air predeterminedly larger than the said given volume is forced into said chamber to preclude entry of liquid into said passage and pump.

2. Apparatus according to claim 1, wherein said supplemental valve means are embodied in the piston structure and are operable to equalize pressures at opposite sides of the piston temporarily each time the piston reverses its direction of movement.

3. Apparatus according to claim 1, wherein said supplemental valve means is incorporated in the piston and comprises a tubular piston head to which the piston proper is secured and which is mounted for axial movement upon a fluted spindle fast on the piston rod, and means on the ends of the fluted spindle co-operating respectively with the respective ends of the piston head to limit relative movement of said head, said means operating alternately at opposite ends of the piston to close the respective ends of the passages formed by the flutings on the spindle but permitting said passages to interconnect opposite sides of the piston temporarily when reversing their operative positions at the end of each piston stroke.

4. Apparatus according to claim 1 wherein auxiliary means are provided in association with said supplemental valve means to prevent exhaustion of air from the said chamber during a portion of the suction stroke of the piston.

5. Apparatus according to claim 1, wherein a housing bored to receive and to provide a seating for said supplemental valve means is provided, mounted adjacent the upper or discharge end of the cylinder, the housing bore being connected at opposite sides of the valve seating to the cylinder space by lateral ports so disposed that during the initial portion of a suction stroke of the piston the valve may lift under the effect of a depression above the piston and so equalize pressures at opposite sides of the piston.

6. Apparatus according to claim 1 including means for limiting the pressure or upward stroke of the piston, comprising a stud extending through the cylinder head for engagement at its inner end by the piston, and means for locking the stud in an adjusted position in said head.

7. Apparatus according to claim 1, including means for limiting the suction or downward stroke of the piston, comprising a perforated disc fast on the piston rod and a stop ring in the lower portion of the cylinder engageable thereby, said stop ring being connected by means guided to permit axial movement only to an outer ring in screw threaded engagement with a manually rotatable sleeve through which the axial position of the stop ring is adjusted.

8. Apparatus according to claim 1, including a spring loaded platform for supporting the bottle or other receptacle to be filled in sealing engagement with the filler head, means for supporting the platform, a spring-loaded, foot-operated treadle mechanism employed to actuate the piston, and a connection between the platform-supporting means and the treadle mechanism to effect a lowering of the platform at the end of the pressure stroke of the piston and so permit removal and replacement of the filled bottle.

9. Apparatus according to claim 1 wherein said supplemental valve means is incorporated in the piston and comprises a tubular piston head to which a piston proper is secured and which is mounted for axial movement upon a fluted spindle fast on the piston rod, a flange mounted on one end of the fluted spindle and the other end thereof being threaded to receive a nut, the inner faces of the flange and the nut and the outer ends of the piston proper being formed with complemental sealing means of which one is an annular rib and the other is a resilient facing, said complemental sealing means cooperating to limit relative movement of said piston proper, said complemental sealing means operating alternately at opposite ends of the piston proper to close the respective ends of the passages formed by the flutings on the spindle but permitting said passages to interconnect opposite sides of the piston proper temporarily when reversing their operative position at the end of each piston stroke.

10. Apparatus according to claim 1 in which said passage enters the upper end of said chamber and said outlet conduit has its entrance in the lower end of said chamber.

11. Apparatus according to claim 1, characterized by the connection of the inlet conduit with a liquid supply and a point of discharge beneath which is placed the receptacle to be filled at which liquid is discharged, whereby any incidental liquid entering the chamber is evacuated therefrom without entering the passage and pump.

12. Apparatus according to claim 1, characterized by the connection of the inlet with a liquid supply, and the outlet conduit is provided with a point of discharge beneath which is placed the receptacle to be filled, whereby liquid drawn into the chamber on the suction stroke of the pump is completely discharged therefrom on the compression stroke of the pump.

13. Apparatus according to claim 1, characterized by the detachable mounting of the cylinder substantially coaxially on a liquid reservoir, the passage of said inlet conduit through the wall of said cylinder to entry into said reservoir, and the provision of an actuating lever for said piston pivoted on the cylinder.

ARTHUR HERBERT PRICE.

REFERENCES CITED

The following references are of record in the file of this patent:

UNITED STATES PATENTS

| Number | Name | Date |
|---|---|---|
| 1,437,917 | Shelor | Dec. 5, 1922 |
| 1,724,839 | Jaden | Aug. 13, 1929 |

FOREIGN PATENTS

| Number | Country | Date |
|---|---|---|
| 609,778 | Germany | Jan. 31, 1935 |